May 23, 1944.  A. E. ULRICH  2,349,776
FRUIT SIZING MACHINE
Filed Sept. 12, 1942  3 Sheets-Sheet 2
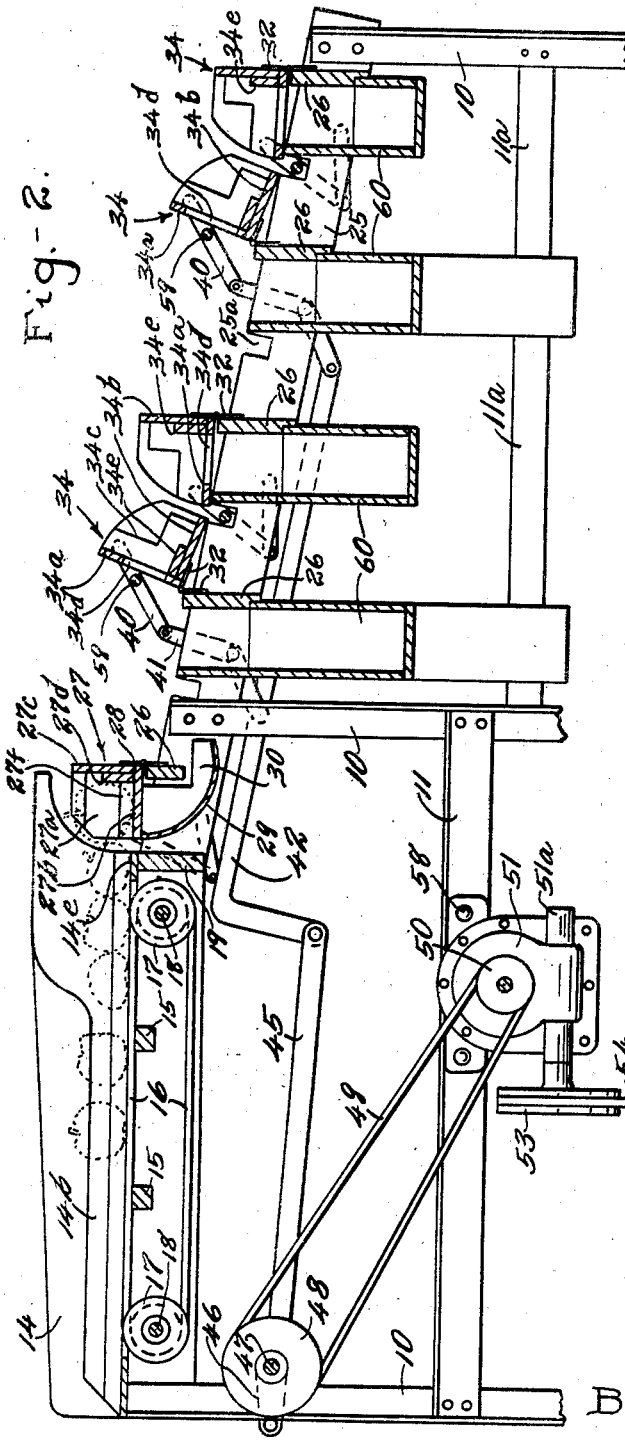
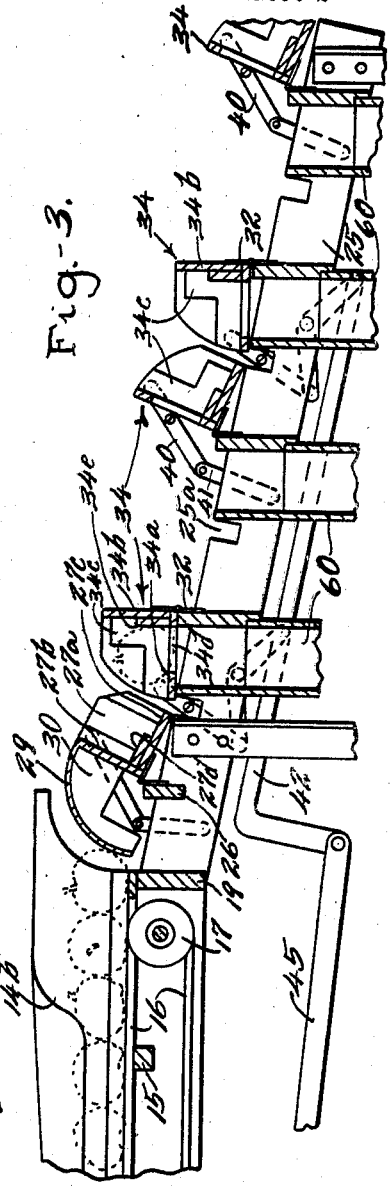
Inventor:
ARNOLD E. ULRICH
By Chas. E. Perf
Attorney

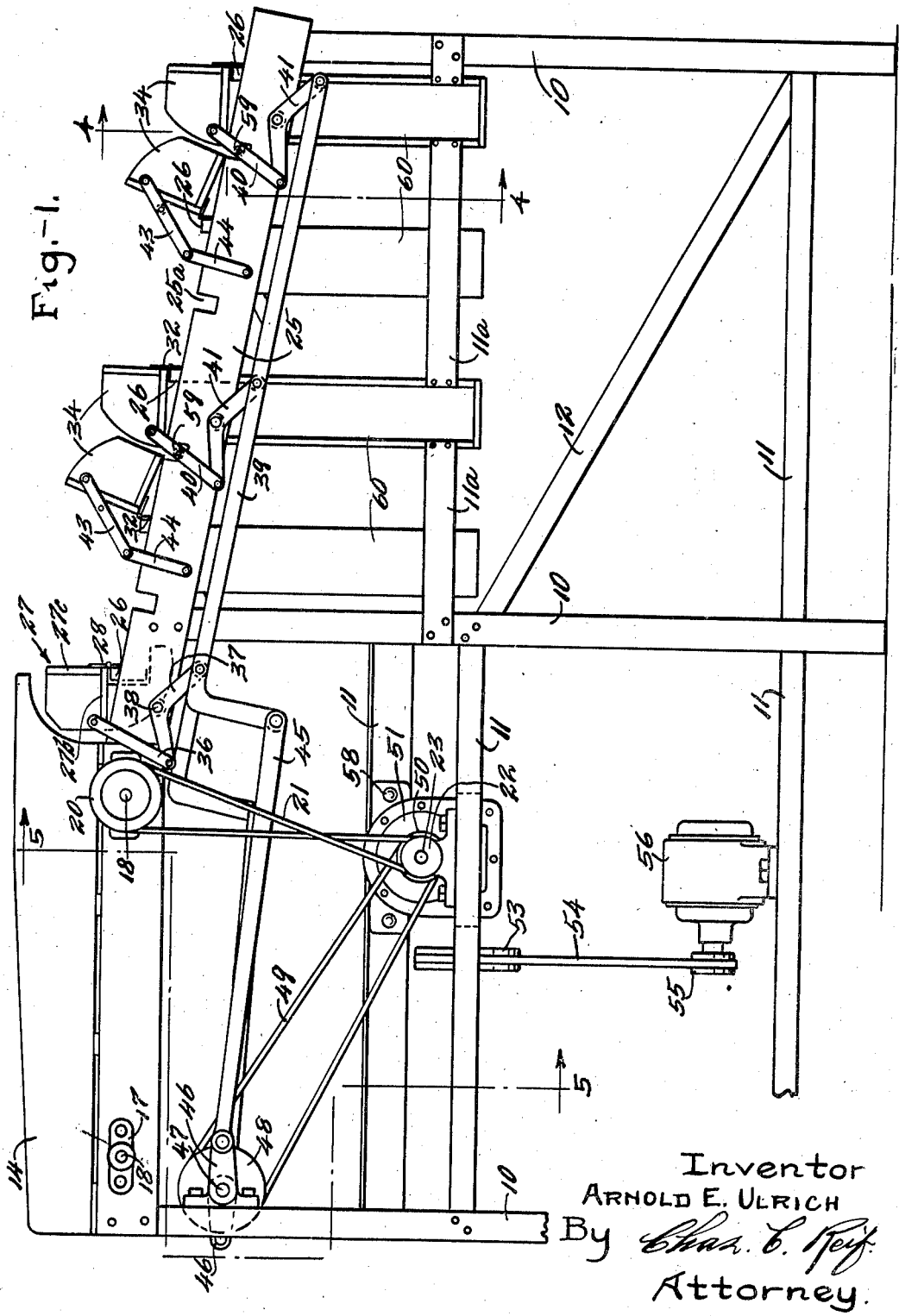

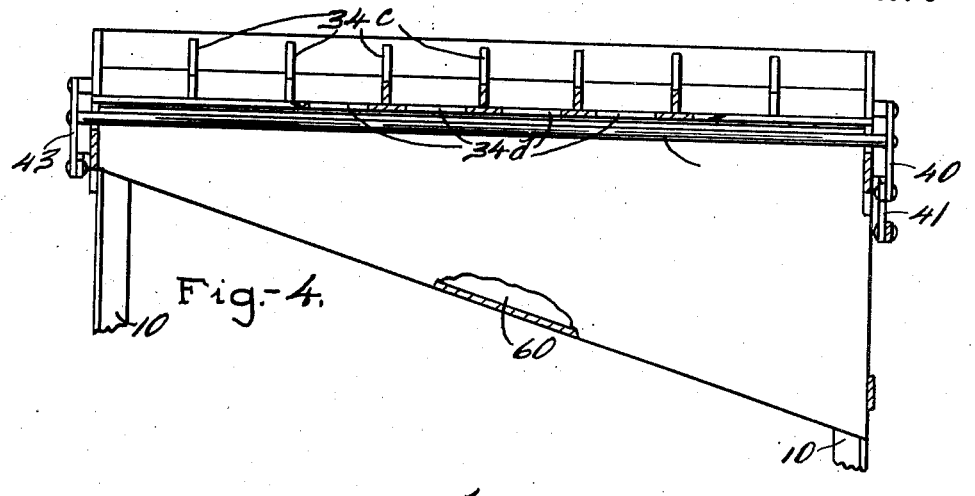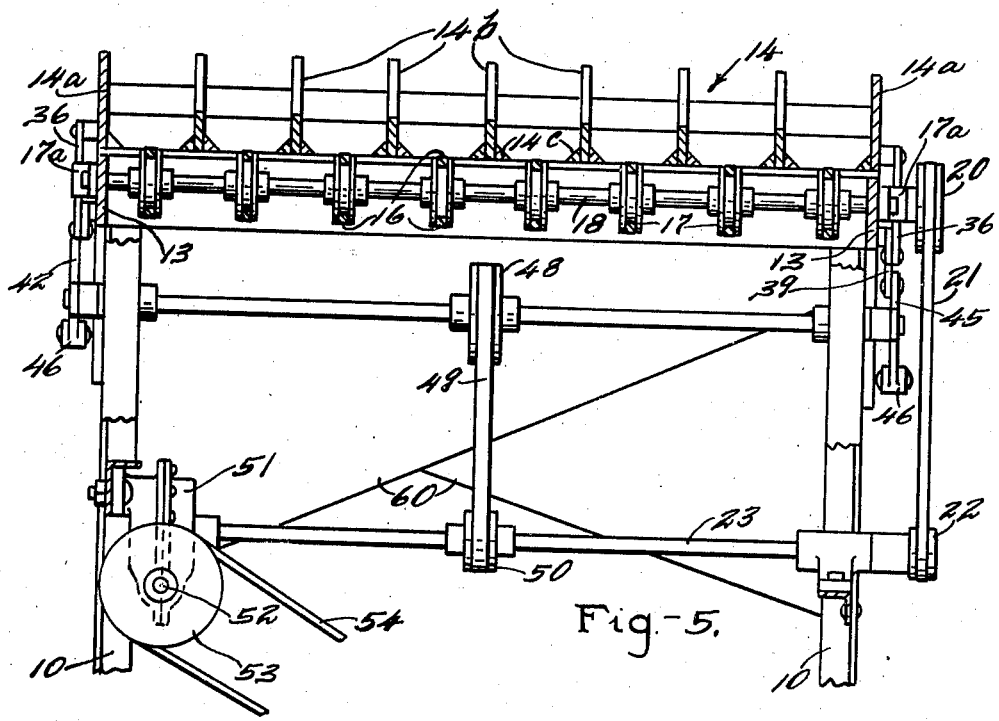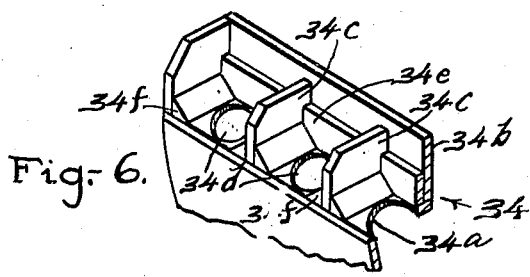

Patented May 23, 1944

2,349,776

UNITED STATES PATENT OFFICE 2,349,776

FRUIT SIZING MACHINE

Arnold E. Ulrich, Rochester, Minn.

Application September 12, 1942, Serial No. 458,074

6 Claims. (Cl. 209—85)

This invention relates to a fruit or vegetable sizing machine, and while the device may have many applications for use with fruits, vegetables and other articles, it has been particularly designed for sorting apples into various sizes.

It is an object of this invention to provide a fruit sizing machine which is simple in construction, positive in operation and one which can be produced in comparatively small sizes so as to be sold at comparatively low price.

It is another object of the invention to provide a fruit sizing machine comprising a series of swinging fruit-receiving and discharging receptacles together with a simple, efficient and positively operated means for discharging any fruit which may become lodged therein.

It is a further object of the invention to provide a fruit sizing machine comprising a plurality of swinging receptacles adapted to receive and discharge specimens of fruit, the discharge side of said receptacle having a novel construction for causing the specimen of fruit to become unbalanced and thus be sure to be discharged.

It is still another object of the invention to provide a fruit sizing machine comprising a plurality of swinging receptacles each receptacle having one or more compartments therein, said compartments being constructed and arranged to center the fruit therein.

It is more specifically an object of the invention to provide a fruit or apple sizing machine comprising a hopper, a swinging member having one or more compartments therein for receiving one or more specimens of fruit respectively and discharging the same in combination with a plurality of swinging receptacles, each having one or more compartments therein, said receptacles being adapted to be swung to receiving position and having openings therein of various sizes respectively through which fruit may drop, said receptacles being adapted to be swung to discharging position to discharge into the adjacent receptacle which is then in a receiving position together with means for swinging said receptacles comprising levers and operating members therefor, said levers and operating members being connected to alternate receptacles at one side of said machine and being connected to the other receptacles on the other side of the machine.

These and other objects and advantages of the invention will be fully set forth in the following description made in connection with the accompanying drawings in which like reference characters refer to similar parts throughout the several views and in which:

Fig. 1 is a view in side elevation of a machine embodying the present invention;

Fig. 2 is a view partly in side elevation and partly in central vertical section, the section being taken through the receptacles;

Fig. 3 is a partial view similar to Fig. 2 showing the parts in another position;

Fig. 4 is a view in vertical section taken on line 4—4 of Fig. 1 as indicated by the arrows;

Fig. 5 is a view in vertical section taken on line 5—5 of Fig. 1 as indicated by the arrows; and Fig. 6 is a perspective view of a portion of one of the receptacles used.

Referring to the drawings, a machine is shown having a frame, and while this could be variously made, in the embodiment of the invention illustrated the same is shown as comprising longitudinally spaced vertical members 10 disposed at opposite sides of the machine and longitudinally extending members 11 in vertically spaced relation, the latter being secured to said members 10. Diagonally extending braces 12 are shown at the rear of the machine. Extending between and secured to the outer sides of the forward pair of vertical members 10 are boards or plates 13. A hopper 14 is mounted on said members 13, the same having side members 14a shown as vertically aligned with members 13. Hopper 14 is divided into a plurality of longitudinally extending compartments by the vertical partitions 14b which extend from end to end thereof in equally spaced relation and as shown in Fig. 3, are reduced in height at the rear portion of the hopper. At the bottoms of partitions 14b the same have secured thereto triangular blocks 14c having surfaces sloping inwardly at substantially 45 degrees. The bottoms of the compartments 14d formed between the partitions 14b are open save for spaced cross pieces 15 and 19 which extend between members 13 and are secured thereto. Arranged to move longitudinally at the bottom of compartments 14d and centrally transversely thereof are endless belts 16 running over pulleys 17 carried on shafts 18 extending between members 13 and through the same and having their ends journalled in bearings 17a secured to the outer sides of members 13. It will be seen that the upper runs of the belts 16 pass along the top sides of members 15. The rear shaft 18 extends beyond bearings 17a at one side thereof and has secured thereto a pulley 20, which pulley is arranged to be driven by a belt 21 running thereover and over a pulley 22 carried on a shaft 23 to be later described.

Secured to the rear pair of members 10 at the outer sides thereof and extending longitudinally and downwardly toward the rear end of the machine are plates or boards 25. These extend forwardly substantially to members 13. Spaced vertical plates or boards 26 extend between and are secured to members 25. A receptacle 27 is provided and while this might be varied in construction, in the embodiment of the invention illustrated it is shown as having two sides at right angles and being open at its other sides. Said receptacle has end walls and is divided into a plurality of compartments by equally spaced partitions 27a. Receptacle 27 is pivotally mounted for swinging movement about an axis disposed substantially at its outer corner or the corner formed by its sides and for this purpose it is connected to a hinge 28 also secured to the forward member 26. Member 27 in one position has its side 27b substantially aligned with or slightly below the top surface of belts 16 and the top surface of a transversely extending plate 14e forming the bottom of hopper 14 at its rear end. It will be noted that the edge of side 27b is disposed quite close to the rear edge of member 14e. The front side or edge of the sides 14a of hopper 14 and the partitions 14b are curved outwardly as shown in Fig. 2, so that they extend over the receptacle 27 when it is in receiving position. A curved plate 29 is secured to the bottom of side 27b at its free edge extending downwardly therefrom through substantially a 90 degree arc. Member 29 has end plates 30 secured thereto, the same being cut away at right angles as shown in Fig. 2, to accommodate cross member 26. Member 27 on its other side 27c has a block or plate 27d secured thereto extending only part way across said side terminating in a right angle so that a step or offset is provided on said side 27c.

Secured to the rear side of each of the other members 26 by hinges 32 are similar receptacles 34. These receptacles each have a receiving side 34a and a discharge side 34b disposed substantially at right angles to each other and are pivoted to swing on hinges 32 about an axis disposed substantially at their outer corners. Each receptacle is divided into a plurality of compartments by equally spaced partitions 34c. The side 34a in each receptacle is provided with an opening 34d substantially circular in shape and these openings will be of different or increasing sizes respectively in the receptacles toward the rear end of the machine. The side 34b of each receptacle has secured thereto a block 34e extending only part way across and terminating in a right angle so that an offset or step is provided in said side. The side walls of the receptacle and the partitions have triangular blocks 34f secured thereto at their bottoms, said blocks having surfaces sloping inwardly toward the bottom at substantially 45 degrees. This is shown in Fig. 6. Similar blocks 27f are disposed at the lower ends of the partitions 27a and the end walls of receptacle 27. The receptacle 27 has secured to one end wall adjacent the free end of side 27b a link 36, the other end of which is connected to the end of one arm of a bell crank lever 37 pivoted on a stud 38 secured in one side member 25. The end of the other arm of bell crank lever 37 is pivotally secured to the operating bar 39. The receptacles 34 each have secured to one end wall thereof adjacent the free end of side 34a a link 40. The other end of this link is secured to the end of one arm of a bell crank lever 41 pivoted on a stud secured in one of the members 25, the end of the other arm of each bell crank lever being secured to an operating bar 39 or a similar operating bar 42 at the other side of the machine. The receptacle 34 adjacent receptacle 27 and alternate receptacles spaced therefrom have the bell crank levers 41 secured to bar 39, while the bell crank levers 41 of the other receptacles are secured to the operating bar 42 at the other side of the machine. At the side of the receptacle opposite that to which link 40 is connected the receptacle has pivoted thereto a similar link 43, the axes of the pivots at each end of the receptacle being substantially in alignment and the other end of each link 43 is pivotally connected to the end of link 44, said latter link being pivotally connected to the member 25. With the described construction it will be seen that when bars 39 and 42 are reciprocated that levers 41 and 37 will be oscillated and the receptacles 27 and 34 will be swung from the position shown in Fig. 2 to the position shown in Fig. 3. The operating bars 39 and 42 have their forward ends bent downwardly substantially at a right angle and the same are pivoted respectively to the ends of links 45, the other ends of which are pivotally connected to crank arms 46 arranged to extend substantially in opposite directions from a shaft 47. Shaft 47 has secured thereto a pulley 48 arranged to be driven by a belt 49 also running over a pulley 50 also mounted on shaft 23. Shaft 23 has secured thereto a worm wheel gear disposed in a casing 51, which worm wheel gear is driven by a worm gear secured to a shaft 52 journalled in bearing portions 51a of casing 51. Shaft 52 also has secured thereto a pulley 53 arranged to be driven by a belt 54 which also runs over a pulley 55 secured to the armature shaft of a motor 56 suitably mounted on some of the frame members 11 as shown in Fig. 1.

Secured adjacent each of the cross pieces 26 except the forward one, and at the forward side thereof is a chute 60, the bottom of which slopes downwardly toward one side of the machine as shown in Fig. 4. The bottoms of alternate chutes incline toward opposite sides of the machine as shown in Fig. 5.

It will be noted that casing 51 is secured by headed and nutted bolts 58 to a longitudinally extending member 11 shown as in the form of an angle member. It will also be noted that chutes 60 have horizontally extending members 11a of the frame secured thereto and extending therebetween and also extending from certain of the chutes to end members 10. The chutes are thus firmly held in position.

It sometimes happens that when an apple is received in the swinging members 34 that it is of a size to fit in one of the openings 34d. Such an apple frequently becomes lodged or sticks in said opening and will neither drop through the opening or be discharged when the receptacle is oscillated to discharging position. To overcome this difficulty means are provided for dislodging such apples as may become stuck or fast in openings 34d. Such means comprises a rod or bar 59 which extends between the links 40 and 43, which links are disposed at each end of the receptacle 34. Said rod 59 will thus swing with links 40 and 43 and when the receptacle is in receiving position said rod 59 will swing into slots 25a formed in the top of the members 25. When the receptacle is moved to discharging position rod 59 moves upward and approaches opening 34d from the bottom of side 34a and comes into close proximity to side 34a.

While any type of driving motor may be used, in the embodiment of the invention illustrated an electrical motor 56 is shown and this will as usual, be provided with suitable conductors and control switch (not shown).

In operation the apples or other fruit handled will be disposed in the hopper 14. This hopper is shown as open at its front end and could be conveniently supplied from another chute or platform not shown. The apples move in between the partitions 14b and will be carried or propelled rearwardly by the belts 16. It will be noted that there is a belt for each compartment 14d. The belts 16 are driven from pulley 20 through belt 21 from pulley 22 secured to shaft 23. Shaft 23 is in turn driven from the worm wheel gear secured thereto through the worm on shaft 52, which latter shaft is in turn driven by pulley 53. Pulley 53 is driven by belt 54 from pulley 55 which is in turn driven from motor 56. At the same time shaft 47 will be rotated by belt 49 and pulley 50 secured to shaft 23. The rotation of shaft 47 rotates the arms 46 and operating bars 39 and 42 will be reciprocated by links 45. Owing to the opposite disposition of cranks 46 it will be seen that bar 39 is in forward position or moves forwardly while bar 42 is in rearward position and vice versa. The apples move down to the rear end of hopper 14 and the end apple moves into receptacle 27. In practice an apple from each compartment 14d will move into each compartment in receptacle 27. The side 27c of receptacle 27 is positioned such a distance from the end of hopper 14 that only one apple can move thereinto. The apple moves rearwardly into it and engages the step member 27d as shown in Fig. 1. The apple is centered in the compartment owing to the walls inclining downwardly toward the center, which inclination is given by the blocks 27f. When the specimen of fruit such as the apple, enters receptacle 27 the parts are in the position shown in Fig. 2. When receptacle 27 has received the apples as described, it is swung by movement of its link 36 and lever 37 by bar 39 to the position shown in Fig. 3. Simultaneously the receptacles 34 are swung from the position shown in Fig. 2 to the position shown in Fig. 3. As receptacle 27 swings through slightly more than 90 degrees, member 29 moves in front of the hopper as shown in Fig. 3, preventing the discharge of any more fruit or apples from said hopper. The apples in receptacle 27 are now discharged as said receptacle comes to the position shown in Fig. 3 and they enter the forward receptacle 34. The member 27d and the members 34d are provided to form the step or offset so that the apple will be unbalanced as sides 27c and 34b come to horizontal or lower position. If the offset were not present the apple might be disposed on the side of the receptacle in such stable equilibrium that it would not be discharged. The step provided causes it to tip or become unbalanced and it quickly rolls into the next receptacle 34. Should any of the apples received in the first receptacle 34 be small enough to drop through the openings 34d they will do so and will be received in the forward chute 60 and will be discharged at the side of the machine into some suitable receptacle. The bars 39 and 42 are again reciprocated by rotation of shaft 47 and receptacle 27 is again swung back to receiving position at the hopper as shown in Fig. 2. The apples retained in the upper receptacle 34 will now be delivered to the next rearward receptacle 34. Should any of these apples be small enough to drop through the opening 34d in the second receptacle 34 they will do so and will pass into the next chute 60 and be delivered at the side of the machine. In the next movement of the receptacles the apples remaining in the second receptacle 34 will be delivered to the next rearward receptacle 34. Any of these apples which are of a size to drop through the openings 34d in the third receptacle 34 will do so and will be received in the third chute 60 and delivered at one side of the machine. The same operation takes place and the apples still remaining in the third receptacle 34 are delivered to the fourth receptacle 34 from the front and those having a certain size will drop through the openings 34d in said fourth receptacle and will be delivered into the rearmost chute 60 and delivered at the side of the machine. Any apples remaining in the rearmost member 34 will in the next movement thereof when it reaches the position shown in Fig. 3, be delivered at the rear end of the machine. A platform or suitable receptacle will be provided for receiving these apples. It will thus be seen that the apples are graded as to size and the different sizes separately delivered. The action of the machine is continuous and it can be quite rapidly operated. As many of the receptacles 34 as desired can be used.

As the receptacles 34 move to discharging position as above stated, the rods 59 move toward openings 34d at the bottoms of sides 34a. These rods 59 will thus engage any apple or specimen of fruit which may have stuck in one of the openings 34d and said apple or specimen will be gently pushed out of said opening so that it will be discharged. The members 59 are positively operated from the actuating levers and links and when the receptacles move to receiving position said rods 59 are entirely out of the way so that they form no obstruction to an apple moving into the receptacle. A very efficient and positively operated means is thus provided for removing any apples which may become stuck in the openings 34d.

From the above description it will thus be seen that I have provided a simple, novel and efficient fruit sizing machine. The machine can be easily made and sold at a price which will be attractive to the small fruit grower. The machine is rapid in operation and has a large capacity. While the handling of the apples or specimens of fruit is quite rapid yet the fruit is gently handled and there is no danger of it being bruised. It is simple in construction and there will be little if any, expense on maintenance and operation. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A fruit sizing device having in combination, a series of swinging receptacles each having one or more fruit receiving compartments therein, said receptacles having sides extending substantially at right angles to each other, one of said sides being adapted to be brought into substantially horizontal position for receiving a specimen of fruit and the other side being adapted to be brought into substantially horizontal position for discharging said specimen, said first mentioned side having an opening therethrough through which fruit of a certain size may drop, said second mentioned side of said receptacle having a step therein intermediate of its width having a restricted surface thus causing the specimen of fruit on the step to tilt over the edge of said step when said receptacle is swung to discharging position thus starting the movement of said specimen and assisting to discharge from said receptacle.

2. A fruit sizing machine having in combination, a series of swinging receptacles having sides extending substantially at right angles to each other, one of said sides being adapted to be brought into fruit-receiving position, said side having an opening therethrough through which fruit of a certain size may drop, means for swinging said receptacles including links secured at opposite ends thereof adjacent the outer edge of the sides thereof having said openings therein and a member extending between and carried by said links and movable in the same general direction as said receptacle, said member moving to position adjacent and beneath said opening when said receptacles are moved to discharging position to dislodge any fruit that may have stuck in said opening, said member moving to position adjacent said edge of said receptacle and below the same when said receptacle moves to receiving position.

3. The structure set forth in claim 2, the pivotal axes of each pair of said links being in substantial horizontal alignment.

4. A fruit sizing machine having in combination, a series of swinging receptacles having sides extending substantially at right angles to each other, one of said sides being adapted to be brought into fruit receiving position and having an opening therethrough through which fruit of a certain size may drop, means for positively swinging said receptacles including swinging links secured at opposite ends of said receptacles and adjacent the edge of the side having said opening therethrough and a member extending between and carried by said links, said member being movable through a comparatively short distance from a position adjacent and slightly below said edge when said receptacle is in receiving position to a position closely adjacent and at the lower side of said opening when said receptacle is in discharging position so that said member will gently engage any specimen of fruit which may have stuck in said opening and will cause it to move out of said opening.

5. A fruit sizing machine having in combination, a frame having spaced longitudinally extending members, a series of swinging receptacles mounted on said frame and extending transversely thereof each receptacle having a plurality of fruit receiving compartments therein, said receptacles having fruit receiving sides and fruit discharging sides, said receiving sides having an opening in each compartment through which fruit of a certain size may drop, a link connected to each end of each receptacle adjacent the outer edge of the side having said opening therethrough, levers connected to said links for swinging the same and a rod extending between the links at the ends of each said receptacle and secured to said links at its ends, said rod being constructed and arranged to move from a position adjacent and a short distance below said edge when said receptacle is in receiving position to a position closely adjacent and at the lower side of said opening when said receptacle is in discharging position so that it will engage a specimen of fruit which may have stuck in said opening and cause the discharge thereof.

6. A fruit sizing device having in combination, a series of swinging receptacles each having one or more fruit receiving compartments therein, certain of said compartments having a side with a sizing opening therethrough and a discharge side adapted to be swung to a downwardly slightly inclined position to discharge a specimen of fruit and means on said discharge side constituting a restricted surface of less transverse dimension than the bottom of a specimen of fruit, said surface terminating in an edge formed by a surface extending substantially at right angles to said restricted surface at its discharge side so that when said receptacle is moved to discharge position said specimen will be caused to tilt over said edge and its discharge movement thus initiated.

ARNOLD E. ULRICH.